United States Patent [19]

Ogawa et al.

[11] Patent Number: 4,759,996
[45] Date of Patent: Jul. 26, 1988

[54] MAGNETIC RECORDING MEDIUM

[75] Inventors: Hikaru Ogawa; Yukio Fukutomi; Masayuki Okutani, all of Hyogo, Japan

[73] Assignee: Mitsubishi Denki Kabushiki Kaisha, Tokyo, Japan

[21] Appl. No.: 936,450

[22] Filed: Dec. 1, 1986

[30] Foreign Application Priority Data

Mar. 20, 1986 [JP] Japan ................. 61-62704

[51] Int. Cl.$^4$ ................................. G11B 5/66
[52] U.S. Cl. ..................... 428/665; 428/668; 428/680; 428/928; 428/936
[58] Field of Search ............... 428/694, 928, 680, 678, 428/668, 936, 665

[56] References Cited

U.S. PATENT DOCUMENTS

| 3,717,504 | 2/1973 | Aonuma et al. | 204/28 |
| 4,019,910 | 4/1977 | Mallory, Jr. | 106/1.23 |
| 4,069,360 | 1/1978 | Yanagisawa et al. | 428/928 |
| 4,152,487 | 5/1979 | Yanagisawa et al. | 428/928 |
| 4,224,381 | 9/1980 | Patel et al. | 428/928 |

FOREIGN PATENT DOCUMENTS 56-47926 4/1981 Japan.

OTHER PUBLICATIONS

Chemical Abstracts 77:78551q, J. Valsiuniene et al, "Electroless Plating of Ternary Nickel Alloy".

*Primary Examiner*—John J. Zimmerman
*Attorney, Agent, or Firm*—Bernard, Rothwell & Brown

[57] ABSTRACT

Disclosed herein is a magnetic recording medium comprising a non-magnetic substrate, a magnetic layer for data recording formed on the substrate, and a protective layer of nickel (Ni)-tungsten (W)-boron (B) ternary alloy formed on the magnetic layer. The magnetic recording medium will find use as a the external storage such as magnetic disk for computers.

2 Claims, 1 Drawing Sheet

MAGNETIC RECORDING MEDIUM

BACKGROUND OF THE INVENTION

1. Field of the Invention

The present invention relates to a magnetic recording medium on which information is magnetically recorded by a magnetic recording-reproducing unit. More particularly, it relates to a magnetic recording medium such as magnetic recording disk, magnetic tape, magnetic drum, and magnetic card capable of storing information in the form of magnetic spots, the information being coded by the magnetic disk unit, magnetic tape unit, etc. which are used as the external memory unit of computers.

2. Description of the Prior Art

With the recent advance in computer technologies, a variety of magnetic recording-reproducing units have come into general use as the external storage of computers. The magnetic recording-reproducing units include magnetic disk recording-reproducing units, magnetic tape recording-reproducing units, magnetic drum recording-reproducing units, and magnetic card recording-reproducing units, which are designed to magnetically store the information which has been processed by the arithmetic logical unit of the computer. These units employ magnetic disk, magnetic drum, magnetic tape, and magnetic card as the information recording medium.

The magnetic recording medium as mentioned above consists of a non-magnetic substrate and a magnetic layer formed on the surface thereof. The magnetic layer is covered with a protective layer having good lubricity. The quality of the magnetic layer affects the amount of information that can be stored, and the quality of the protective layer affects the lubricity between the magnetic recording medium and the magnetic head installed for recording and reproducing in the magnetic recording-reproducing unit. The protective layer, therefore, plays an important role in improving the durability and life of both the magnetic recording medium and the magnetic head. For this reason, many attempts have been made so far to improve the magnetic layer and the protective layer.

As a result of such attempts, there was proposed a new magnetic recording medium by Fuji Photo Film Co., Ltd. (see U.S. Pat. No. 3,717,504). According to the disclosure, this magnetic recording medium comprises "a non-magnetizable substrate, a magnetic recording layer having a thickness greater than 0.05 micron plated onto one surface of said substrate, a first protective layer consisting essentially of a nickel film plated on the exposed surface of said magnetic recording layer and having a thickness less than 0.2 micron and a second protective layer consisting essentially of a rhodium film plated on the exposed surface of said first protective layer and having a thickness greater than 0.02 micron."

There was also proposed "a magnetic recording medium" by Hitachi Ltd., as disclosed in Japanese Patent Laid-open No. 47926/1981 (Apr. 30, 1981). According to the disclosure, it is composed of a substrate 1, a backing layer 2, a magnetic layer 3, a first protective layer 4, and a second protective layer 5, as shown in FIG. 1. The substrate 1 is made of an aluminum (Al) alloy or magnesium (Mg) alloy. The backing layer 2, which has a mirror-finish surface, is formed by plating the substrate 1 with a copper (Cu)-tin (Sn) alloy, nickel (Ni)-tin (Sn) alloy, nickel (Ni)-phosphorus (P) alloy, or copper (Cu)-zinc (Zn) alloy. The magnetic layer 3 is formed by plating the backing layer 2 with a magnetic cobalt (Co)-nickel (Ni)-phosphorus (P) alloy or the like. The first protective layer 4, which is intended to protect the magnetic layer from corrosion, is formed by plating the magnetic layer 3 with a nickel (Ni)-phosphorus (P) alloy. The second protective layer 5 is formed by applying a fluorinated hydrocarbon such as perfluoroalkyl polyether to the first protective layer 4.

The magnetic recording medium having the laminate structure as mentioned above functions in the following manner. As the magnetic recording medium slidingly passes across the magnetic head, data is recorded in the magnetic layer 3 or data stored in the magnetic layer 3 is retrieved. During the passage of the magnetic recording medium, the second protective layer 5, which is a fluorinated hydrocarbon, provides lubricity to protect the magnetic layer 3 from wear by the magnetic head.

The above-mentioned conventional magnetic recording medium has to have the first and second protective layers on the surface of the magnetic layer. Because of the dual protective layers, the conventional magnetic recording medium is inevitably thicker than necessary.

In the second example of the prior art, the outermost second protective layer of fluorinated hydrocarbon such as perfluoroalkyl polyether is not satisfactory for protection for a long period of time. This leads to poor reliability. In addition, the dual protective layers need additional production steps which lead to an increase in production cost.

SUMMARY OF THE INVENTION

It is an object of the present invention to provide a thin magnetic recording medium which has sufficient corrosion resistance without the dual protective layers.

It is another object of the present invention to provide a highly reliable magnetic recording medium which retains the corrosion resistance of the surface layer for a long period of time.

It is further another object of the present invention to provide a low-cost magnetic recording medium which can be produced in a simple manner because there is only one improved protective layer on the magnetic layer.

The magnetic recording medium of this invention is characterized by that the protective layer on the magnetic layer is formed by electroless plating from a ternary alloy of nickel (Ni), tungsten (W), and boron (B).

DETAILED DESCRIPTION OF THE PREFERRED EMBODIMENTS

The invention will be described in more detail with reference to the following preferred embodiments.

Figure 1:
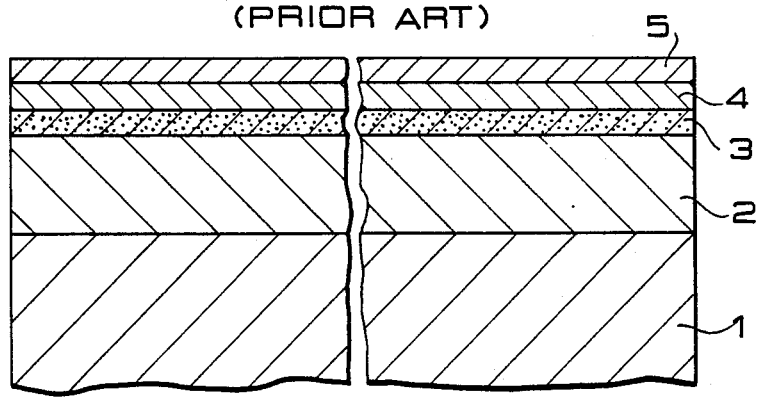
FIG. 1 is a partial sectional view showing the conventional magnetic recording medium.
Figure 2:
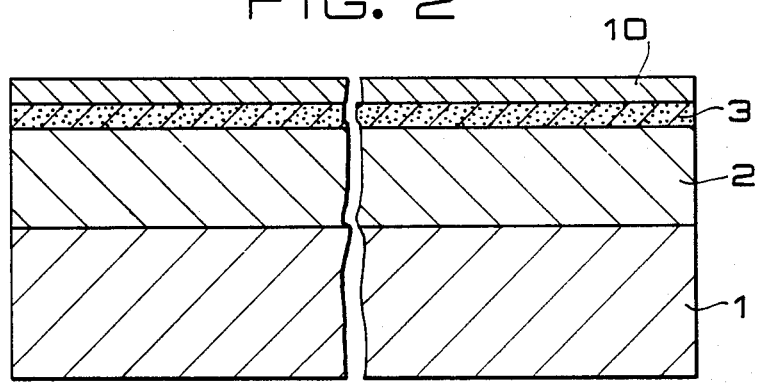
FIG. 2 is a partial sectional view showing the magnetic recording medium pertaining to this invention.

Referring now to the drawings wherein like reference characters designate like or corresponding parts throughout the two views a FIG. 2 shows in section the magnetic recording medium of this invention. It is composed of a substrate 1, a backing layer 2, a magnetic layer 3, and a protective layer 10. The substrate 1 is made of a non-magnetic metal such as Al alloy and Mg alloy. The backing layer 2 is formed by plating the substrate with a Ni-P alloy or a like after the pretreatment which consists of Zn replacement. The magnetic layer 3 is formed by plating the polished surface of the backing layer with a Co-Ni-P alloy. (The construction of the substrate 1, backing layer 2, and magnetic layer 3 is almost the same as that in the conventional magnetic recording medium explained earlier with reference to FIG. 1.) The protective layer 10 is formed on the top of the magnetic layer 3 by electroless plating of an Ni-W-B ternary alloy.

The process for forming the protective layer 10 will be explained in detail. The laminate composed of the substrate 1, the backing layer 2, and the magnetic layer 3 is dipped in an electroless plating bath containing 20 g/L of nickel sulfate, 40 g/L of sodium tungstate, 10 g/L of sodium borohydride, and 2 cc/L of ammonia water at 60° to 80° C. As the result of electroless plating, a 0.05 to 0.1 μm thick film is formed on the magnetic layer 3.

The protective layer 10 formed in the above-mentioned manner was aged at 60° C. and 90% RH for 20 days. After aging, the protective layer of Ni-W-B ternary alloy remained unchanged in color and the magnetic recording medium remained unchanged in coercive force and magnetic flux density.

The first protective layer 4 formed on the conventional magnetic recording medium as mentioned earlier was examined under the same conditions as in Test Example. After aging, the protective layer 4 became considerably discolored and the performance of the magnetic layer 3 deteriorated. The initial coercive force decreased from 850 oersted to 420 oersted and the residual magnetic flux density decreased from 11,000 gauss to 9,200 gauss.

The results of the test examples apparently indicate that the magnetic recording medium of this invention is greatly improved in durability or life and also in reliability.

In the above-mentioned example, the magnetic recording medium is composed of a non-magnetic substrate 1 of Al alloy or Mg alloy, a backing layer 2 of Ni-P alloy, a magnetic layer 3 of Co-Ni-P alloy, and a protective layer 10 of Ni-W-B ternary alloy. However, the scope of the invention is not limited to this example, but the invention can be applied to any kind of magnetic recording medium having a magnetic layer.

In the above-mentioned example, the protective layer 10 is formed by electroless plating. However, the scope of the invention is not limited to this example, but the protective layer may be formed by any plating process.

The backing layer 2 formed between the substrate 1 and the magnetic layer 3 may be formed from the Ni-W-B ternary alloy used for the protective layer, because it is a non-magnetic substance.

As mentioned above, the magnetic recording medium of this invention is characterized by the magnetic layer for data recording being covered with a protective layer of Ni-W-B ternary alloy. The protective layer protects the magnetic layer from corrosion for a long period of time and maintains the reliability of magnetic recording medium.

Unlike the conventional magnetic recording medium having the dual protective layers, the one in this invention has only one protective layer. This contributes to the reduction of the overall thickness of the magnetic recording medium. In addition, the magnetic recording medium having a single protective layer is simpler in production process and available at a lower cost than the conventional one.

What is claimed is:

1. A magnetic recording medium comprising a non-magnetic substrate, a magnetic layer provided in a thin film form on a face side of said non-magnetic substrate, said magnetic layer comprising a metallic material containing at least cobalt (Co), and a protective layer provided in a thin film form on said magnetic layer in order to protect said magnetic layer, wherein said protective layer comprises a thin film of a nickel (Ni)-tungsten (W)-boron (B) ternary alloy deposited on the surface of said magnetic layer in a thickness of 0.05 to 0.1 μm by subjecting said substrate provided thereon with said magnetic layer to a plating treatment in a solution containing 20 g/l of nickel sulfate, 40 g/l of sodium tungstate, 10 g/l of boron sodium hydroxide and 2 cc/l of ammonia at a temperature of 60° to 80° C.

2. A magnetic recording medium according to claim 1, wherein said magnetic layer comprises a cobalt (Co)-nickel (Ni)-phosphorus (P) alloy.

* * * * *